May 25, 1965 W. C. ERDMAN ETAL 3,184,984

TRANSMISSIONS

Filed March 4, 1963 3 Sheets-Sheet 1

INVENTORS
WILLIAM C. ERDMAN
WILLIAM F. LEONARD

INVENTORS
WILLIAM C. ERDMAN
WILLIAM F. LEONARD

United States Patent Office 3,184,984
Patented May 25, 1965

3,184,984
TRANSMISSIONS
William C. Erdman and William F. Leonard, Jackson, Mich., assignors to Clark Equipment Company, a corporation of Michigan
Filed Mar. 4, 1963, Ser. No. 263,097
4 Claims. (Cl. 74—333)

The present invention relates to transmissions and is more particularly concerned with a transmission for a self-propelled vehicle to provide for forward and reverse drive of the vehicle.

In the conventional and well known transmissions of the type embodying an input shaft, an output shaft, and a countershaft, together with gear and clutch arrangements to provide multiple forward drive ratios and reverse drive between the input and output shafts, it has been the practice to effect reverse drive by gear train between the countershaft and the output shaft comprising essentially three gears, one of such three gears being in effect an idler gear so that the output shaft may be driven in a direction opposite to that of the input shaft. Such transmissions as noted essentially require three gears to effect reverse drive.

In accordance with this invention, reverse drive may be obtained by means of a gear train of but two gears arranged between the input and output shafts and which, as will be readily apparent, effects a substantial economy in the cost of the transmission by the elimination of a gear. In addition, by reason of the present invention a compact transmission is provided enabling its convenient assembly in a vehicle.

Accordingly, it is an object of the present invention to provide in a transmission for effecting forward and reverse drives between input and output shafts, a simplified arrangement of gears for effecting reverse drive of the output shaft of the transmission.

A further and more specific object of the invention is to provide in a transmission having input, output and countershafts, first gear means between the input and countershafts to effect rotation of the countershaft, second gear means between the countershaft and output shaft, means comprising clutch means associated with the second gear means to provide in engaged position for drive of the output shaft in one direction, such as forward drive, by the countershaft, and a gear member connected to the output shaft, and means comprising a gear mounted on the input shaft and cooperable with the gear member connected to the output shaft to effect drive of the latter in the other direction, such as reverse drive, directly by the input shaft in the disengaged position of the clutch means.

In order to accomplish the foregoing objects, it is proposed according to the present invention to provide a transmission having an input shaft, an output shaft and a countershaft. A first gear mounted on the input shaft has meshing engagement with a second gear on the countershaft to continuously rotate the countershaft. The countershaft has a plurality of additional gears thereon which are preferably in constant meshing engagement with one each of a like number of gears rotatably mounted on the output shaft, and together with means including clutch means for effecting selective clutching of pairs of such means for effecting selective clutching of pairs of such plurality of gears to provide a multiple number of drive ratios of the output shaft by the countershaft. Preferably, in the arrangement noted, the clutch means includes a gear member connected to the output shaft which is adapted to have selective meshing engagement with a gear mounted on the input shaft and which latter gears when engaged impart rotation of the output shaft in its other direction, such as reverse drive directly by the input shaft.

A preferred feature of the invention resides in providing clutch means for selectively effecting forward drive through a transmission by clutching of gears between a countershaft and an output shaft with a gear component adapted to have meshing engagement with a gear on the input shaft for effecting a reverse drive through the transmission.

Now in order to acquaint those skilled in the art with the manner of constructing and utilizing a transmission in accordance with the principles of the present invention, there is described below a preferred embodiment of the invention.

Figure 1:
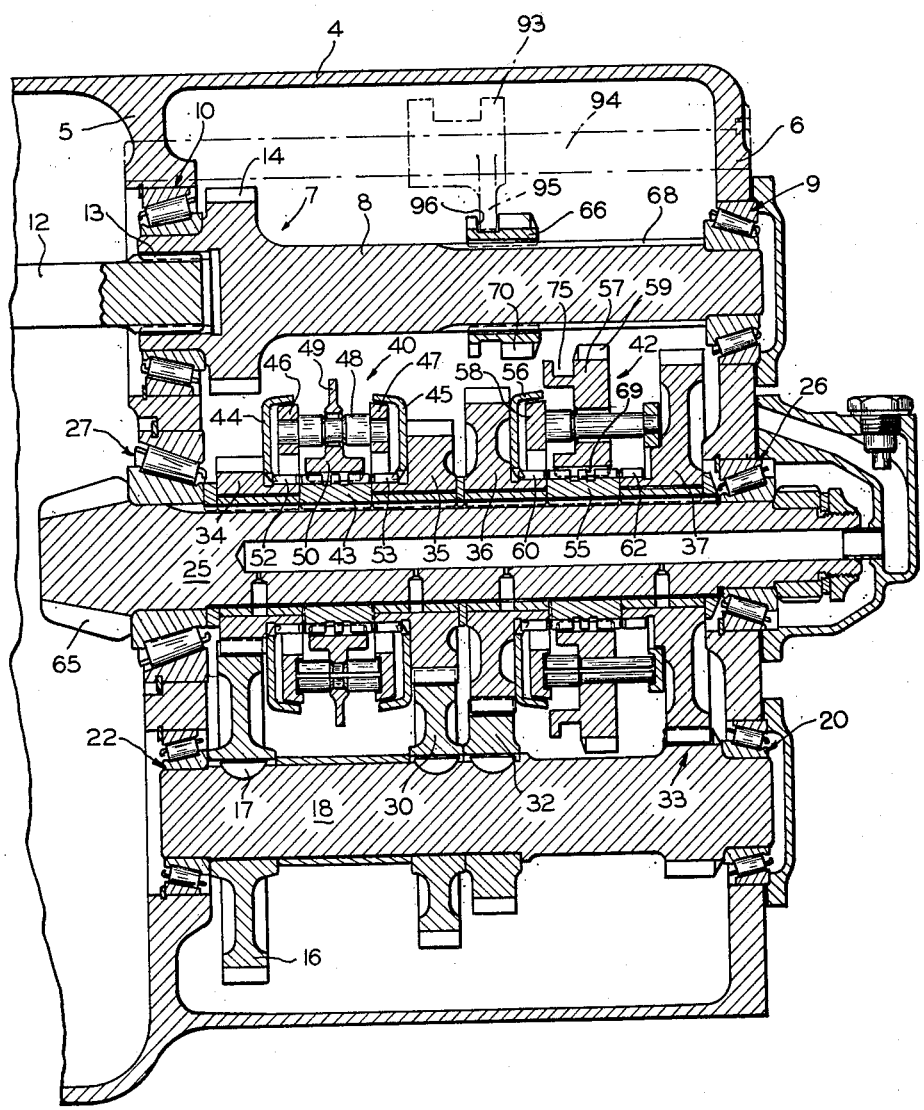
FIGURE 1 is a horizontal sectional view through a transmission embodying the present invention, but showing the countershaft of the transmission rotated just short of 180° from its normal position.

Referring now to the drawings, the transmission comprises a casing 4 having an intermediate wall 5 and an end wall 6. A two part input shaft 7 is composed of a first shaft 8 journalled at its opposite ends as by roller bearing assembly 9 in the end wall 6, and a roller bearing assembly 10 in the intermediate wall 5, and a second shaft 12 having splined connection at its outer end as at 13 with an adjacent internally splined portion of the shaft 8. The shaft 12 has conventional connection with a prime mover for effecting driving rotation of the input shaft 7. The shaft 8 as shown has an input gear 14 formed as an integral part thereof. The input gear 14 has constant meshing engagement with a gear 16 suitably keyed at 17 to the countershaft 18. The countershaft 18 is mounted for rotation by the support of one end thereof in a roller bearing assembly 20 in the end wall 6, and its other end is journalled in a roller bearing assembly 22 mounted in a conventional way in the intermediate wall 5. An output shaft 25 is journalled at its outer end in a conventional roller bearing assembly 26 in the end wall 6 and at its opposite end in a roller bearing assembly 27 in the intermediate wall 5. The usual end cap members and components for the outer ends of the several shafts are mounted as shown on end wall 6. It will be noted that a plurality of gears are rotatable with and are disposed in axially spaced relation on the countershaft 18 such as the gears 30, 32 and a gear 33 formed as an integral part of the countershaft. The gears 16, 30, 32 and 33 of the countershaft have constant meshing engagement with a plurality of like number of gears, such as gears 34, 35, 36 and 37, respectively, suitably journalled on the output shaft 25. The several gears 16, 30, 32 and 33 of the countershaft, together with gears 34, 35, 36 and 37, respectively, provide a plurality of pairs of gear sets between the counter shaft 18 and the output shaft 25 to provide for a plurality of ratios of drive of the output shaft in one direction thereof, such as the forward direction of the vehicle, when the gears 34, 35, 36 and 37 are selectively clutched with gears 16, 30, 32 and 33, respectively by clutch assemblies indicated generally at 40 and 42, respectively.

The clutch assembly 40, as shown, is arranged between the gears 34 and 35 and the clutch assembly 42 is arranged between gears 36 and 37.

The clutch assembly 40, as shown, comprises a known arrangement of a collar member 43 keyed to the output shaft and the gears 34 and 35 each carry respectively, synchronizer rings 44 and 45 which are adapted to be engaged by synchronizer members 46 and 47 carried by known blocking pin synchronizer members 48. A shift collar 49 in its neutral position is centered with respect of the opposite ends of the pins 48. Upon movement of the collar member 49 to the left, the synchronizer member 46 engages the synchronizer ring 44 and upon movement of collar 49 to the right, the synchronizer member 47 engages the synchronizer ring 45 to effect synchronizing of the rotation of the gears 34 and 35, respectively before engagement of the positive clutch teeth of clutch member 50, which is splined to the collar member 43, with the positive clutch teeth 52 and 53 of the gears 34 and 35, respectively. Thus, upon movement of the shift collar 49 to the left, the gear 34 is caused to be synchronized with the speed of rotation of the output shaft 25 before engagement of the positive dog clutch teeth of the shift collar 50 with the clutch teeth 52 of gear 34, and upon shifting movement of the clutch collar 49 to the right the gear 35 is synchronized with the speed of rotation of the output shaft 25 before engagement of the positive clutch teeth of the shift collar 50 with the clutch teeth 53 of the gear 35. As indicated, the clutch assembly 40 is of known construction and any suitable form of synchronizing device for the purpose may be employed in practicing the present invention.

Referring now to the clutch means shown at 42, it comprises a clutch collar 55 splined to the output shaft 25. Similarly to the gears 34 and 35 as previously described, the gear 36 is provided with a synchronizer ring 56 but the gear 37 in this instance is not provided with a synchronizing mechanism. A combined shift collar and gear member 57 has splined connection with the clutch collar 55 and upon movement of the shift collar 57 to the left, a synchronizing ring member 58 is adapted to have engagement with the synchronizing ring 56 to bring the gear 36 into synchronism with the output shaft 25 prior to engagement of the positive clutch teeth 60 of the member 57 with the positive clutch teeth 60 of gear 36.

Upon movement of the member 57 to the right to effect lower or first ratio drive through the transmission, the positive clutch teeth 69 of the shift collar 57 engages the positive clutch teeth 62 of the gear 37. Thus, as in accordance with normal practice, no synchronizing means is embodied for the first ratio drive of the transmission in that normal engagement of positive clutch teeth 69 of the shift collar with the positive clutch teeth 62 of the first or low ratio gear 37 provides a satisfactory device. However, synchronizing components as before described may be utilized if desired. The output shaft 25 has a pinion 65 at its outer end which has connection with suitable known gear mechanism for imparting drive to the vehicle in which the transmission is installed.

In the arrangement of components as before noted, and in accordance with the present invention there is provided a pinion 66 splined to the input shaft 8 as at 68 for movement axially of the shaft. Further, the member 57 of the clutch 42 has a portion thereof in the form of a gear having external gear teeth 59. The gear teeth 59 are adapted to have meshing engagement with the gear teeth 70 of the gear collar 66 as by axial shifting movement of the collar 66 to the right to engage the gear teeth 70 with the gear teeth 59. It will be noted that the member 57 as illustrated in FIGURE 1 of the drawings has a neutral position in which it is keyed to the output shaft 25. With the member 57 in the position noted and upon shifting movement of the collar 66 to the right to engage the teeth 70 with the teeth 59 of the member 57, the input shaft will effect drive of the output shaft in a direction opposite to the direction imparted to the output shaft through the several gear sets comprising pairs of the aforementioned gears 16, 30, 32 and 33 and gears 34, 35, 36 and 37, respectively. Thus, with the member 57 in its neutral position, reverse drive is imparted to the output shaft 25 directly from the gear 70 of the collar member 66 to the gear 59 of member 57 of the clutch means 42. It will be seen that member 57 of the clutch means 42 is provided with an annular groove 75 for receiving a fork for effecting the selective shifting of the member 57 from its neutral position to clutch gear 36 to the output shaft 25 as by movement of the member 57 to the left or to clutch gear 37 to the output shaft 25 by movement of the member 57 to the right to thus provide two forward drive ratios to the output shaft 25 from the countershaft 18. However, with the member 57 in its neutral position as illustrated in the drawing and by engaging its gear teeth 59 with the gear teeth 70 of the collar member 66, reverse drive is imparted to the output shaft 25 directly from the input shaft 12.

Figure 2:
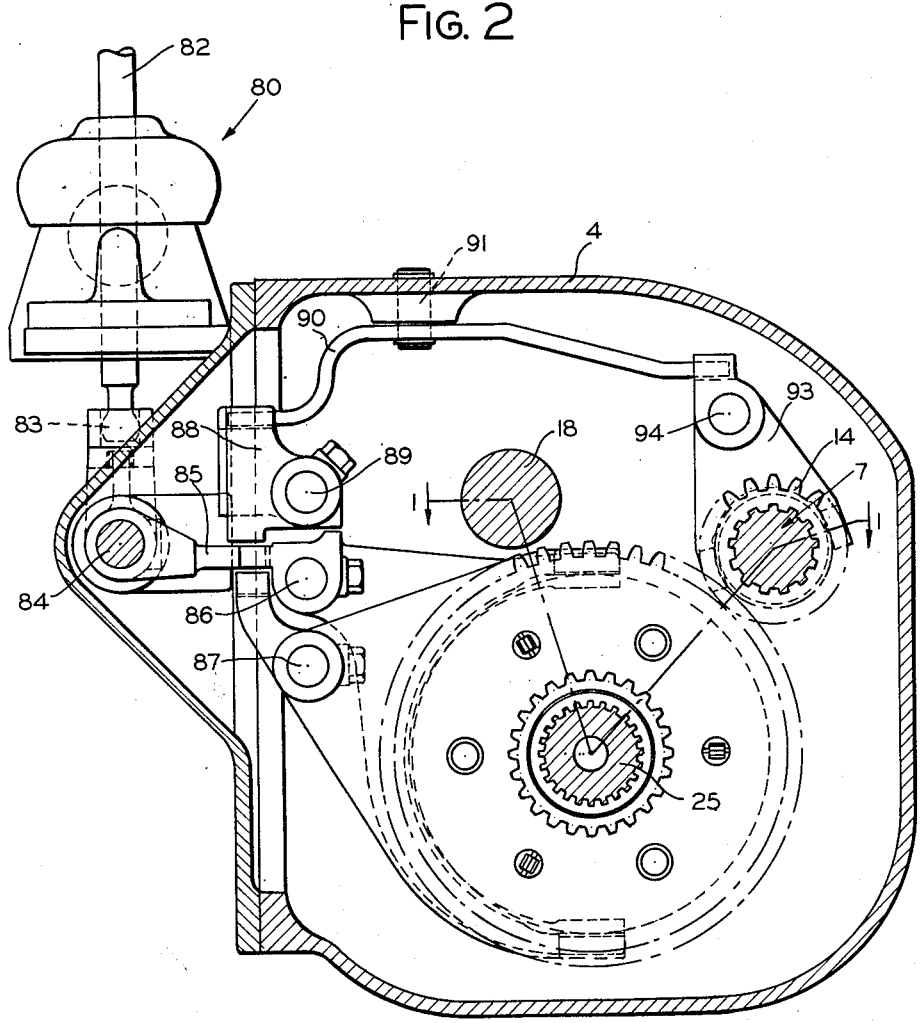
FIGURE 2 is an end view of the transmission showing the actual position of the input, output and countershafts of the transmission, the axes of which extend parallel to each other and which in cross-section lie at the apices of a triangle.
Figure 3:
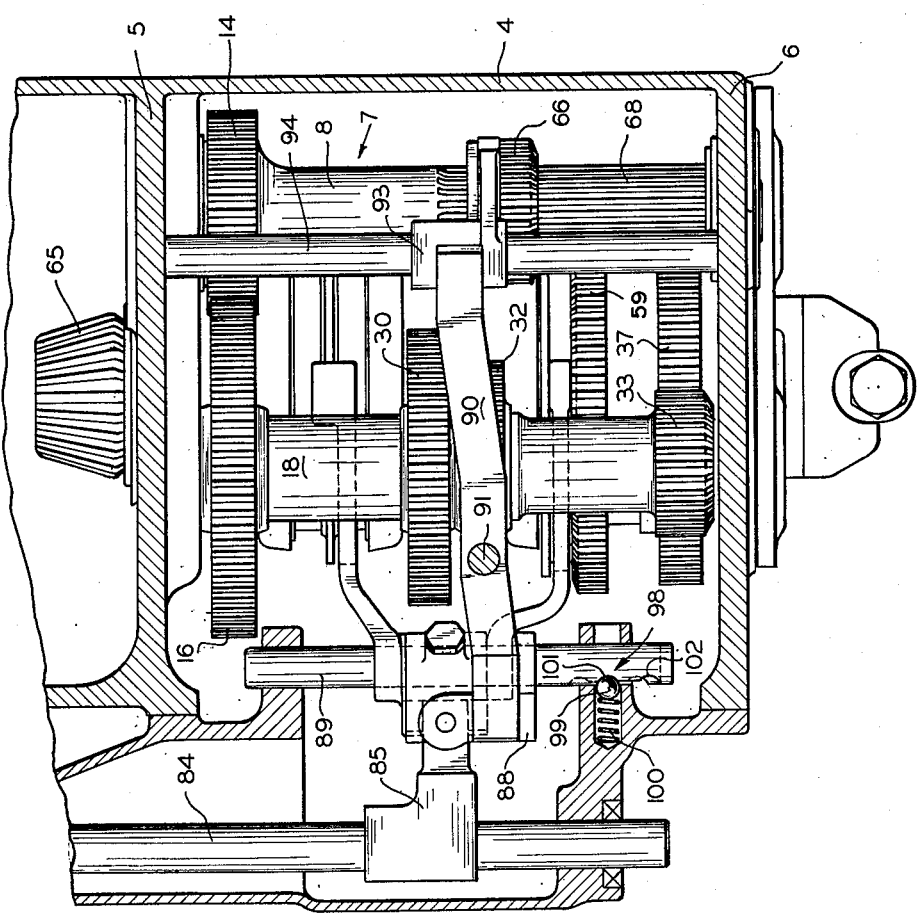
FIGURE 3 is a plan view of the transmission as shown in FIGURE 2 with the upper end of the transmission casing open.

Referring now to FIGURE 2, we have shown a conventional manual gear shift selecting means 80 comprising a gear shift lever 82 which through a conventional ball and socket joint 83 provides for selective rectilinear movement of a shift rail 84 to effect the selective disposition of a shift finger 85 for movement of member 49 or shift collar 57 in a conventional manner via shift rails 86 and 87, respectively. The shift lever 82 is further manipulatable so that it may effect movement of a collar member 88 mounted on an axially movable shift rail 89. A lever 90 is pivoted intermediate its ends as at 91 and one end of the lever has connection with collar 88 and its other end with a yoke 93 mounted for axial sliding movement on a rod 94. The yoke 93 is formed with tongue 95 fitting into a groove 96 of the collar 66. Thus by appropriate manipulation of the gear shift lever 82, the shift collar 49 and member 57 may be moved selectively either to the right or to the left to effect a desired forward drive ratio through the transmission or manipulated to effect engagement of the clutch collar 66 with the gear 59 of member 57 of the clutch means 42 to effect reverse drive from the input shaft to the output shaft of the transmission. Suitable spring detent means 98 is provided between the transmission casing 4 and the rail 89 and comprises a ball 99 loaded by spring 100. The ball 99 has selective engagement with recesses 101 and 102 so as to retain the collar member 66 in engaged and unengaged positions of its gear teeth 70 with the gear teeth 59 of member 57, respectively.

From the foregoing it will be observed that by the present invention a transmission is provided in which a reverse drive is effected by the provision of a simple pair of gear members between an input and an output shaft in accordance with the aforedescribed objects of the invention.

It will be understood that various modifications and rearrangements may be made in the transmission above described without departing from the spirit and scope of the present invention.

The invention claimed is:

1. A transmission comprising an input shaft, an output shaft, and a countershaft, first gear means between said input shaft and said countershaft for effecting rotation of said countershaft by said input shaft, second gear means between said countershaft and said output shaft, means associated with said second gear means comprising clutch means operable in its engaged position for effecting clutching of said second gear means to effect rotation of said output shaft in one direction by said countershaft, said last named means including a gear member connected to said output shaft, and gear means associated with said input shaft engageable with said gear member for selectively effecting rotation of said output shaft in the other direction by said input shaft in the disengaged position of said clutch means.

2. A transmission comprising an input shaft, an output shaft, and a countershaft, first gear means between said input shaft and said countershaft for effecting rotation of said counter shaft by said input shaft, second gear means between said countershaft and said output shaft to provide a plurality of drive ratios therebetween, clutch means associated with said second gear means operable in engaged positions thereof for selectively effecting clutching of said second gear means to effect rotation of said output shaft in one direction at different drive ratios by said countershaft, said clutch means having a gear member connected to said output shaft and reverse gear means comprising third gear means mounted on said input shaft for movement selectively into engagement with said gear member of said second gear means for effecting rotation of said output shaft in the other direction by said input shaft in the disengaged position of said clutch means.

3. A transmission comprising an input shaft, an output shaft, and a countershaft, first gear means between said input shaft and said countershaft for effecting rotation of said countershaft by said input shaft, second gear means between said countershaft and said output shaft, clutch means associated with said second gear means operable in engaged positions thereof for selectively effecting clutching of said second gear means to effect rotation of said output shaft in one direction at a plurality of different drive ratios by said countershaft, said clutch means including a reverse gear connected to said output shaft, and a gear mounted on said input shaft for movement selectively into engagement with said reverse gear of said clutch means to effect rotation of said output shaft in the other direction by said input shaft in the disengaged position of said clutch means.

4. A transmission comprising an input shaft, an output shaft, and a countershaft, first and second gears mounted on said input shaft and said countershaft, respectively, having constant meshing engagement for effecting rotation of said countershaft by said input shaft, a third gear mounted on said countershaft, a fourth gear journalled on said output shaft and having constant meshing engagement with said third gear, clutch means for selectively clutching said fourth gear to said output shaft to effect driving of said output shaft in one direction by said countershaft, said clutch means including a fifth gear mounted for rotation with said output shaft, and a sixth gear mounted for movement selectively axially on said input shaft into and out of engagement with said fifth gear, and said sixth gear when engaged with said fifth gear effecting rotation of said output shaft in the other direction by said input shaft.

References Cited by the Examiner
UNITED STATES PATENTS 3,064,488 11/62 Lee et al. _____ 74—360
3,115,048 12/63 Cape _____ 74—375

DON A. WAITE, *Primary Examiner.*